United States Patent
Kang et al.

(10) Patent No.: US 10,976,967 B2
(45) Date of Patent: Apr. 13, 2021

(54) METHOD, APPARATUS AND COMPUTER PROGRAM PRODUCT FOR MANAGING STORAGE SYSTEM AND MOVEMENT OF DATA FROM SOURCE EXTENT TO FREE EXTENT IN DESTINATION STORAGE, WHEREIN SELECTION OF THE DESTINATION STORAGE IS BASED ON REQUESTS WAITING TO ACCESS SOURCE DEVICE, REQUEST WAITING FOR ACCESS THE DESTINATION STORAGE DEVICE AND WORKLOAD OF THE SOURCE EXTENT

(71) Applicant: EMC IP Holding Company LLC, Hopkinton, MA (US)

(72) Inventors: Jianbin Kang, Beijing (CN); Shaoqin Gong, Beijing (CN); Geng Han, Beijing (CN); Jian Gao, Beijing (CN); Lei Sun, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 94 days.

(21) Appl. No.: 16/356,281

(22) Filed: Mar. 18, 2019

(65) Prior Publication Data
US 2020/0026468 A1 Jan. 23, 2020

(30) Foreign Application Priority Data
Jul. 20, 2018 (CN) .......................... 201810801468.9

(51) Int. Cl.
*G06F 3/06* (2006.01)

(52) U.S. Cl.
CPC .......... *G06F 3/0689* (2013.01); *G06F 3/0611* (2013.01); *G06F 3/0644* (2013.01); *G06F 3/0647* (2013.01); *G06F 3/0665* (2013.01)

(58) Field of Classification Search
CPC .... G06F 3/0647; G06F 3/0611; G06F 3/0644; G06F 3/065
See application file for complete search history.

(56) References Cited

U.S. PATENT DOCUMENTS

| | | |
|---|---|---|
| 9,940,033 B1 | 4/2018 | Alshawabkeh et al. |
| 9,965,218 B1 | 5/2018 | Martin et al. |
| 10,013,170 B1 | 7/2018 | Sahin et al. |

(Continued)

*Primary Examiner* — Reginald G Bragdon
*Assistant Examiner* — Chie Yew
(74) *Attorney, Agent, or Firm* — BainwoodHuang

(57) ABSTRACT

Techniques manage a storage system. In accordance with certain techniques, respective response times of multiple storage devices associated with the storage system are obtained. An extent whose workload satisfies a predefined condition is selected as a source extent from multiple extents on a source storage device in response to a response time of the source storage device among the multiple storage devices being above a predefined threshold. A destination storage device is selected from the multiple storage devices, the destination storage device having a lower workload than the source storage device. Data on the source extent are moved to a free extent on the destination storage device. Additionally, a balance may be stricken between workloads of various storage devices in a resource pool, and then the overall response speed of the resource pool may be increased.

21 Claims, 9 Drawing Sheets

(56) References Cited

U.S. PATENT DOCUMENTS

| | | | |
|---|---|---|---|
| 10,078,569 B1 | 9/2018 | Alshawabkeh et al. | |
| 10,254,970 B1 | 4/2019 | Martin et al. | |
| 10,261,717 B1 | 4/2019 | Martin et al. | |
| 10,268,526 B1 | 4/2019 | Martin | |
| 10,282,107 B1 | 5/2019 | Martin et al. | |
| 10,339,455 B1 | 7/2019 | Parush-Tzur et al. | |
| 10,809,931 B1 | 10/2020 | Martin et al. | |
| 2008/0109601 A1* | 5/2008 | Klemm | G06F 3/0608 711/114 |
| 2009/0198940 A1* | 8/2009 | Ash | G06F 3/0611 711/165 |
| 2012/0173814 A1* | 7/2012 | Kawaguchi | G06F 3/0605 711/114 |
| 2013/0151683 A1* | 6/2013 | Jain | G06F 3/0611 709/223 |
| 2019/0384521 A1* | 12/2019 | Patel | G06F 3/0653 |

* cited by examiner

METHOD, APPARATUS AND COMPUTER PROGRAM PRODUCT FOR MANAGING STORAGE SYSTEM AND MOVEMENT OF DATA FROM SOURCE EXTENT TO FREE EXTENT IN DESTINATION STORAGE, WHEREIN SELECTION OF THE DESTINATION STORAGE IS BASED ON REQUESTS WAITING TO ACCESS SOURCE DEVICE, REQUEST WAITING FOR ACCESS THE DESTINATION STORAGE DEVICE AND WORKLOAD OF THE SOURCE EXTENT

CROSS-REFERENCE TO RELATED APPLICATION(S)

This application claims priority to Chinese Patent Application No. CN201810801468.9, on file at the China National Intellectual Property Administration (CNIPA), having a filing date of Jul. 20, 2018, and having "METHOD, APPARATUS, AND COMPUTER PROGRAM PRODUCT FOR MANAGING STORAGE SYSTEM" as a title, the contents and teachings of which are herein incorporated by reference in their entirety.

FIELD

Various implementations of the present disclosure generally relate to storage management, and more specifically, to a method, apparatus and computer program product for managing a storage system (e.g. Redundant Array of Independent Disks (RAID)).

BACKGROUND

With the development of data storage techniques, various data storage devices now provide users with increasingly high data storage capacity, and their data access speed has been improved greatly. With the increase of data storage capacity, users also impose greater demands on data reliability and response time of storage systems. So far a variety of data storage systems based on redundant arrays of disks have been developed to improve reliability of data. When one or more disks in a storage system fail(s), data in failed disk(s) can be recovered from other normal disk.

Mapped Redundant Array of Independent Disks (mapped RAID) has been developed so far. In the mapped RAID, a disk is a logical concept and may include multiple extents that may be distributed over different physical storage devices in a resource pool. Multiple extents included in one logical disk may be distributed over different physical storage devices in a resource pool. Regarding multiple extents in one stripe of the mapped RAID, they are supposed to be distributed over different physical storage devices, so that when a physical storage device where one extent among the multiple extents resides fails, a rebuild operation may be executed so as to recover data from a physical storage device where other extent resides.

It will be understood that due to the difference in service time and service condition between various storage devices in the resource pool, these storage devices might have different response speed. In daily usage of the resource pool, a circumstance might arise in which the slowdown of a certain storage device causes the workload of the storage device to increase significantly and a large number of data access requests wait to access the storage device for a period of time. At this point, it becomes a tough technical issue regarding how to balance workloads between various storage devices in the resource pool and further increase the overall response speed of the resource pool.

SUMMARY

Therefore, it is desirable to develop and implement a technical solution for managing a storage system more effectively. It is desired that the technical solution can be compatible with existing storage systems and manage existing storage systems more effectively by reconstructing various configurations of these storage systems.

According to a first aspect of the present disclosure, there is provided a method for managing a storage system. The method includes: obtaining respective response times of multiple storage devices associated with the storage system; selecting an extent, whose workload satisfies a predefined condition, as a source extent from multiple extents on a source storage device in response to a response time of the source storage device among the multiple storage devices being above a predefined threshold; selecting a destination storage device from the multiple storage devices, the destination storage device having a lower workload than the source storage device; and moving data on the source extent to a free extent on the destination storage device.

According to a second aspect of the present disclosure, there is provided an apparatus for processing a computing task, including: at least one processor; a volatile memory; and a memory coupled to the at least one processor, the memory having instructions stored thereon, the instructions, when executed by the at least one processor, causing the apparatus to perform acts. The acts include: obtaining respective response times of multiple storage devices associated with the storage system; selecting an extent, whose workload satisfies a predefined condition, as a source extent from multiple extents on a source storage device in response to a response time of the source storage device among the multiple storage devices being above a predefined threshold; selecting a destination storage device from the multiple storage devices, the destination storage device having a lower workload than the source storage device; and moving data on the source extent to a free extent on the destination storage device.

According to a third aspect of the present disclosure, there is provided a computer program product. The computer program product is tangibly stored on a computer readable medium and includes machine executable instructions which, when executed, cause the machine to implement a method according to the first aspect.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION

Figure 1A:
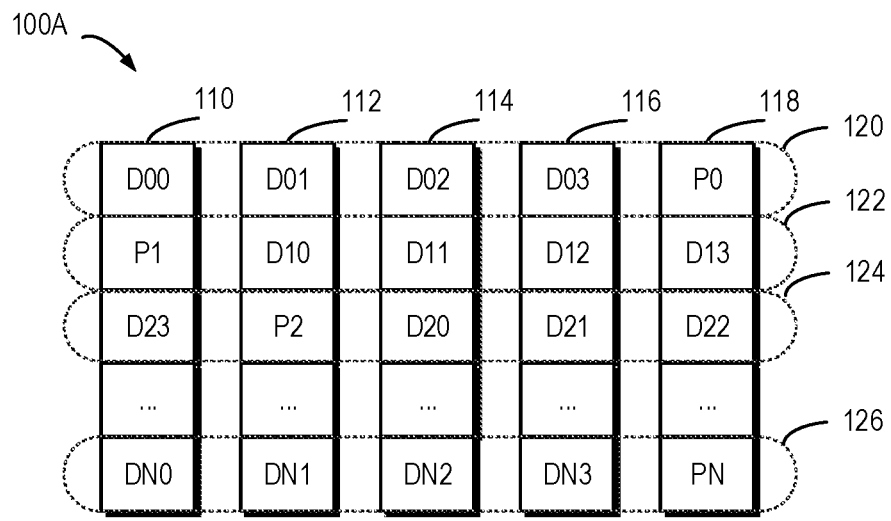
FIGS. 1A and 1B each illustrate a schematic view of a storage system in which a method of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

In the context of the present disclosure, the storage system may be a RAID-based storage system. The RAID-based storage system may combine multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

FIG. 1A schematically illustrates a schematic view of a storage system 100A in which a method of the present disclosure may be implemented. In the storage system shown in FIG. 1A, working principles of RAID are illustrated by taking a RAID-5 (4D+1P, where 4D represents that 4 storage devices are included in the storage system for storing data, and 1P represents that 1 storage device is included in the storage system for storing parity) array that consists of five independent storage devices (110, 112, 114, 116 and 118) as an example. It should be noted although five storage devices are schematically shown in FIG. 1A, in other implementations more or less storage devices may be included according to different levels of RAID. Moreover, although FIG. 1A illustrates stripes 120, 122, 124, . . . , 126, in other examples the RAID system may further include a different number of stripes.

In RAID, a stripe crosses multiple physical storage devices (for example, the stripe 120 crosses storage the devices 110, 112, 114, 116 and 118). The stripe may be simply construed as a storage area among multiple storage devices which satisfies a given address range. Data stored in the stripe 120 includes multiple parts: a data block D00 stored in the storage device 110, a data block D01 stored in the storage device 112, a data block D02 stored in the storage device 114, a data block D03 stored in the storage device 116, and a data block P0 stored in the storage device 118. In this example, the data blocks D00, D01, D02 and D03 are stored data, and the data block P0 is a P parity of the stored data.

The mode of storing data in other stripes 122 and 124 is similar to that in the stripe 120, and the difference is that the parity about other data block may be stored in other storage device than the storage device 118. In this way, when one of the multiple storage devices 110, 112, 114, 116 and 118 fails, data in the failed device may be recovered from other normal storage devices.

Figure 1B:
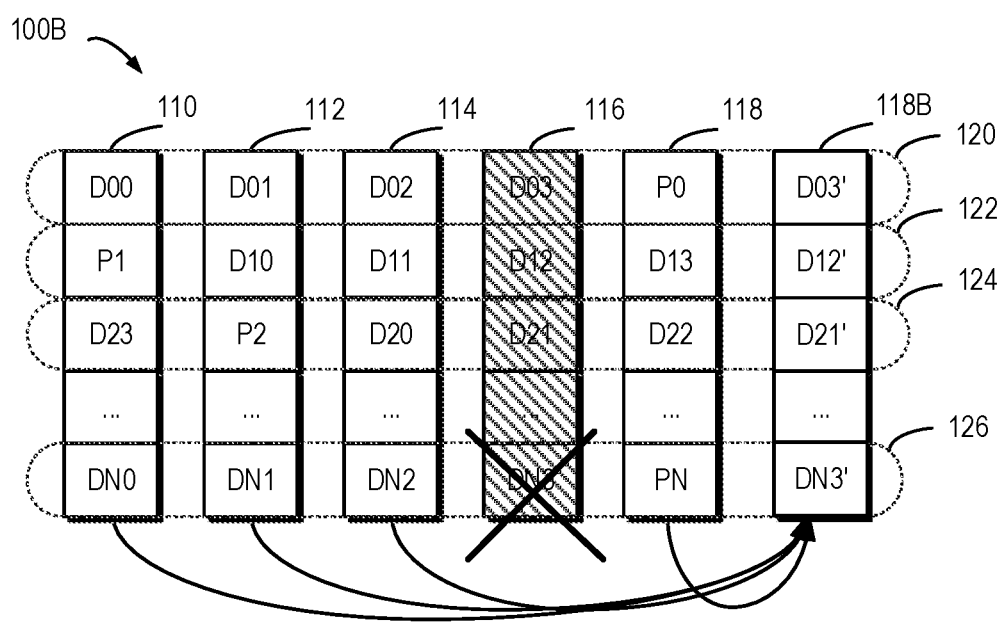

FIG. 1B schematically illustrates a schematic view 100B of rebuilding process of the storage system 100A. As shown in FIG. 1B, when one storage device (e.g. the shaded storage device 116) fails, data may be recovered from the other storage devices 110, 112, 114 and 118 that operate normally. At this point, a new backup storage device 118B may be added to RAID to replace the storage device 118. In this way, recovered data may be written to 118B, and system rebuilding may be realized.

Note while a RAID-5 storage system including 5 storage devices (among which 4 storage devices are used for storing data and 1 storage device is used for storing parity) has been described with reference to FIGS. 1A and 1B, according to definition of other RAID levels, there may further exist a storage system including a different number of storage devices. On the basis of definition of RAID-6, for example, two storage devices may be used to store parity P and Q respectively. For another example, according to definition of triple-parity RAID, three storage devices may be used to store parity P, Q and R respectively.

Figure 2:
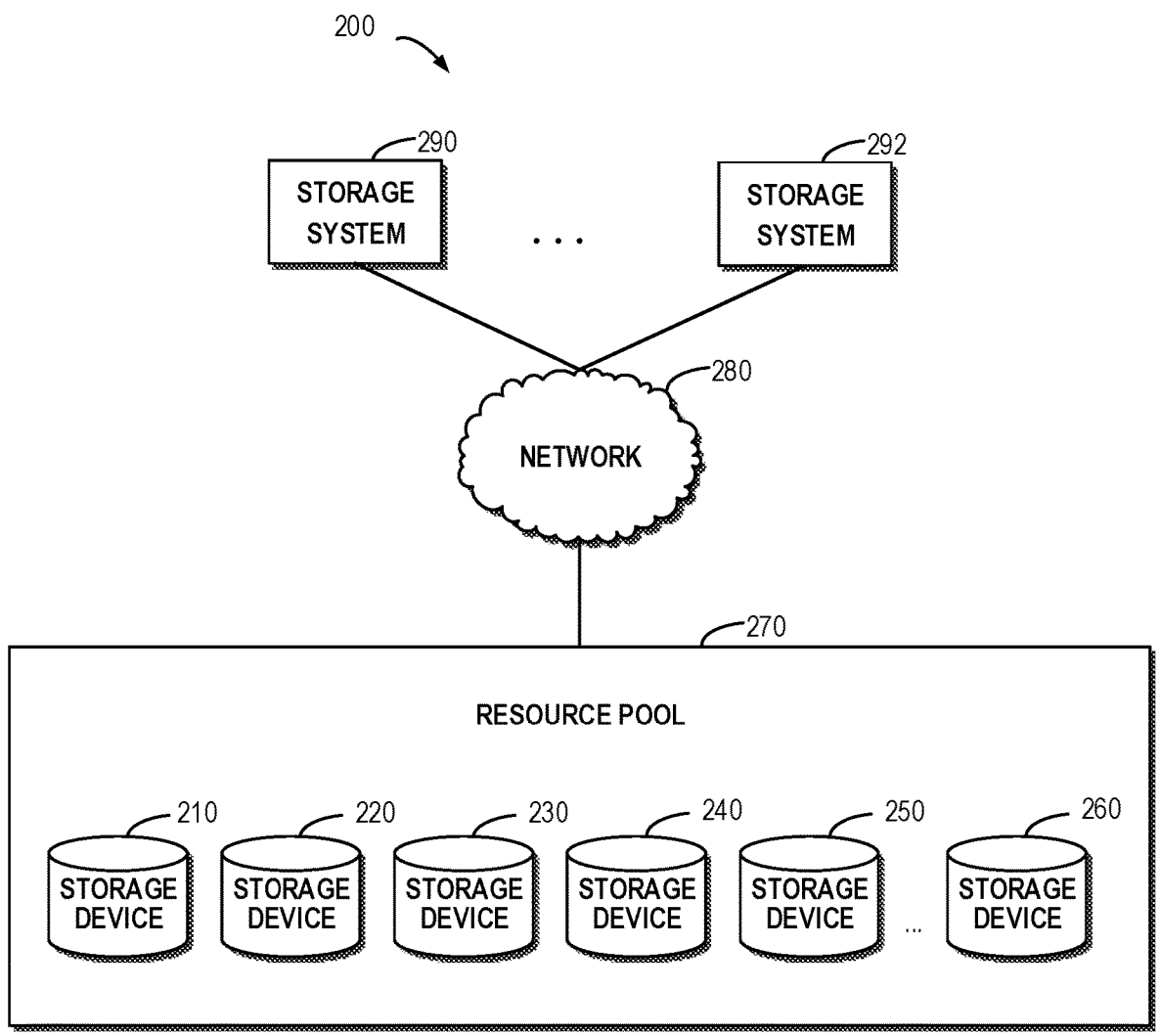
FIG. 2 schematically illustrates a block diagram of an example environment in which a method of the present disclosure may be implemented.

With the development of distributed storage technologies, the various storage devices 110, 112, 114, 116 and 118 in the storage system shown in FIGS. 1A and 1B may be no longer limited to physical storage devices but may be virtual storage devices. For example, respective extents on the storage device 110 may come from different physical storage devices (hereinafter referred to as storage devices for short) in the resource pool. FIG. 2 schematically shows a block diagram of an example environment in which the method of the present disclosure may be implemented. As depicted, a storage resource pool 270 may include multiple physical storage devices 210, 220, 230, 240, 250, . . . , 260. At this point, storage space in the multiple storage devices may be allocated to multiple storage systems 290, . . . , 292. At this point, these storage devices 290, . . . , 292 may access the storage space in the various storage devices in the storage resource pool 270 via a network 280.

Figure 3:
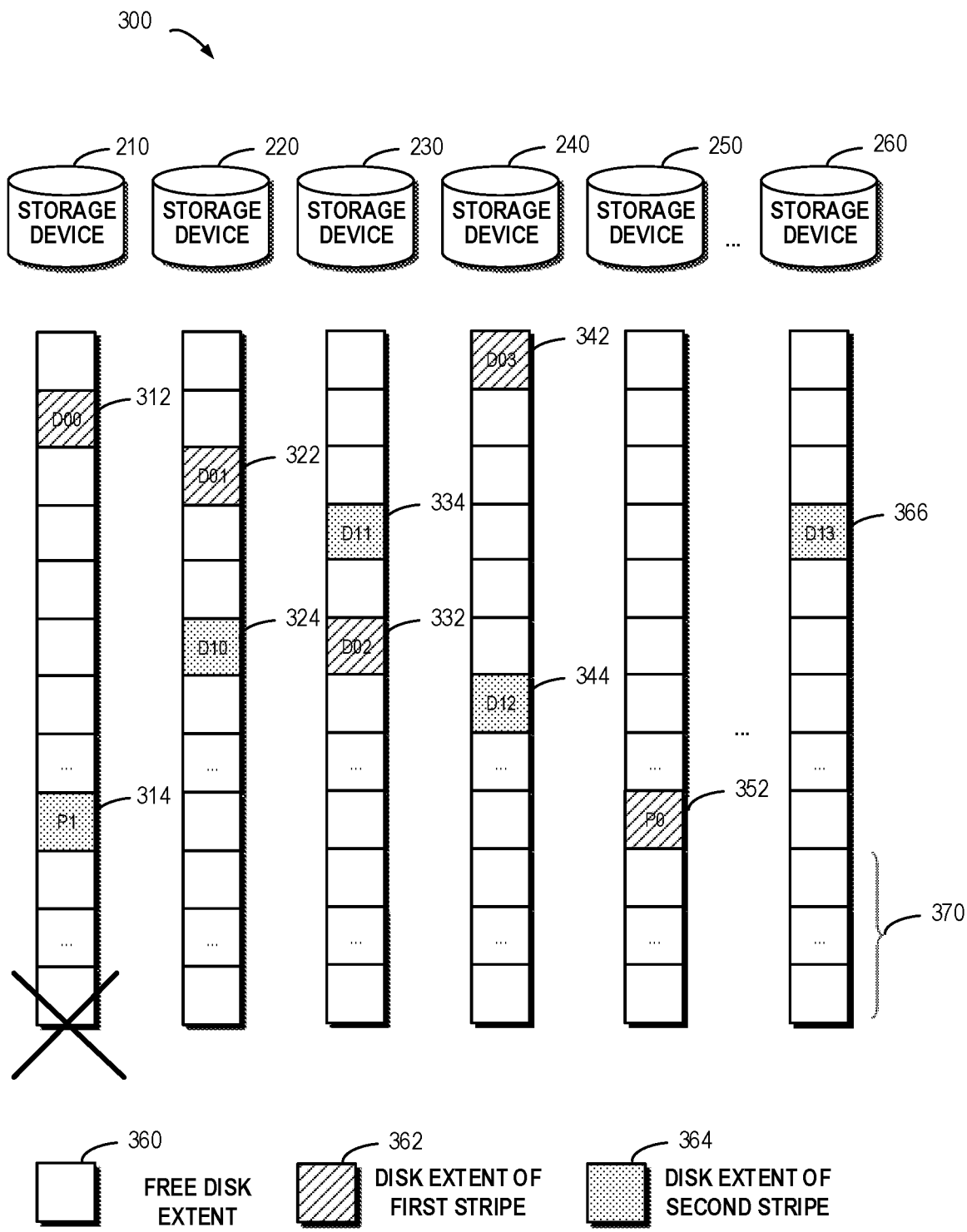
FIG. 3 schematically illustrates a diagram of a storage resource pool in FIG. 2.

FIG. 3 schematically shows a diagram of more information of the storage resource pool 270 as shown in FIG. 2. The resource pool 270 may include multiple storage devices 210, 220, 230, 240, 250, . . . , 260. Each storage device may include multiple extents, for example, a schematic view of extents included in each storage device is shown in the upper portion of the storage device. A blank extent (as shown by a legend 360) represents a free extent, an extent (as shown by a legend 362) shown with slashes represents an extent for a first stripe of the storage system 100A in FIG. 1, and an extent (as shown by a legend 364) shown in shades represents an extent for a second stripe of the storage system 100A in FIG. 1. At this point, extents 312, 322, 332, 342 and 352 for the first stripe are for storing data blocks D00, D01, D02, D03 and parity P0 of the first stripe respectively. Extents 324, 334, 344, 366 and 314 for the second stripe are for storing blocks D10, D11, D12, D13 and parity P1 of the second stripe respectively.

As shown in FIG. 3, there may exist a reserved free portion 370 in each storage device, so that when a storage device in the resource pool fails, extents in the free portion 370 in each storage device may be selected to rebuild various extents in the failed storage device.

Note in FIG. 3 the 4D+1P RAID-5 storage system is taken as an example to illustrate how extents in various stripes are distributed over multiple storage systems in the resource pool. When RAID based on other level is used, those skilled in the art may implement concrete details on the basis of the above described principles. For example, in the 6D+1P+1Q RAID-6 storage system, 8 extents in each stripe may be distributed over multiple storage devices so as to ensure a load balance between the multiple storage devices.

It will be understood that the storage devices 210 to 260 are not indefinitely usable but have specific service lives. When the wear level of a storage device reaches a certain degree, the response speed of the storage device might decrease, and further the response speed of the whole storage system is affected. In addition, too concentrated access requests in a period of time or other reasons might further cause the response speed decrease in the storage device. There has been proposed a technical solution for managing the storage resource pool 270 and updating devices on the basis of the wear level of each storage device in the storage resource pool 270. However, the technical solution can only provide alerts when some storage device in the resource pool 270 needs to be replaced, but fails to find a storage device with lower response speed and perform corresponding processing in daily usage and allocation of resources.

To solve the foregoing drawbacks, implementations of the present disclosure provide a method, apparatus and program product for managing a storage system. According to example implementations of the present disclosure, the storage device may include one or more disks, which may be provided as different types, such as SAS (Serial Attached SCSI (Small Computer Standard Interface)) disk or Solid State Disk (SSD in short). To describe implementations of the present disclosure in a clearer way, first explanations are given to definitions of technical terms involved in the present disclosure.

Disk I/O response time $T_{io}$: this term represents the disk's response time for an I/O request. $T_{io}$ may be calculated on the basis of the number of I/Os processed at predefined time intervals (e.g. 10 seconds or other time duration). For example, with 10 seconds as time intervals, suppose a certain storage device responds to 1000 I/O requests within 10 seconds, then at this point $T_{io}$=10/1000=0.01 s=10 ms.

Disk I/O queue length $Q_{io}$: this term represents the length of a queue of requests waiting to access the disk, in other words, represents the number of requests waiting to access the disk.

Disk response time $T_d$: this term represents the needed time for the disk to complete all requests in the waiting queue. The disk's response time $T_d$ may be determined from Equation 1.

$$T_d = Q_{io} \times T_{io} \qquad \text{Equation 1}$$

Disk safe queue length $Q_s$: this term represents the maximum number of requests waiting to access the storage device, which supports the normal operation of the storage device. An initial value of the safe queue length $Q_s$ may be set for each storage device in the storage system. For example, regarding an SSD disk with faster speed, the initial value may be set to 120. Regarding a SAS disk with lower speed, the initial value may be set to 40 or other value.

Extent I/O load $L_{de}$: this term represents the number of requests sent to one extent in the storage device per second. The extent's I/O load $L_{de}$ may be calculated on the basis of the number of requests sent to the extent within a predefined period of time.

Specific implementations of the present disclosure will be described in detail. According to implementations of the present disclosure, provided is a technical solution for managing a storage system. Specifically, there is provided a method for managing a storage system. In the method, first response times of multiple storage devices associated with the storage system are obtained. If a response time of a source storage device among the multiple storage devices is above a predefined threshold, an extent whose workload satisfies a predefined condition is selected as a source extent from multiple extents on the source storage device. Next, a destination storage device is selected from the multiple storage devices, the destination storage device having a lower workload than the source storage device. Finally, data on the source extent are moved to a free extent on the destination storage device.

With the above example implementation, an extent with a heavier workload on a storage device with a longer response in a resource pool 270 may be moved to a storage device with a lower workload in the resource pool 270. In this way, the response time of the storage system may be reduced, and further the response speed of the whole storage system may be improved.

Figure 4:
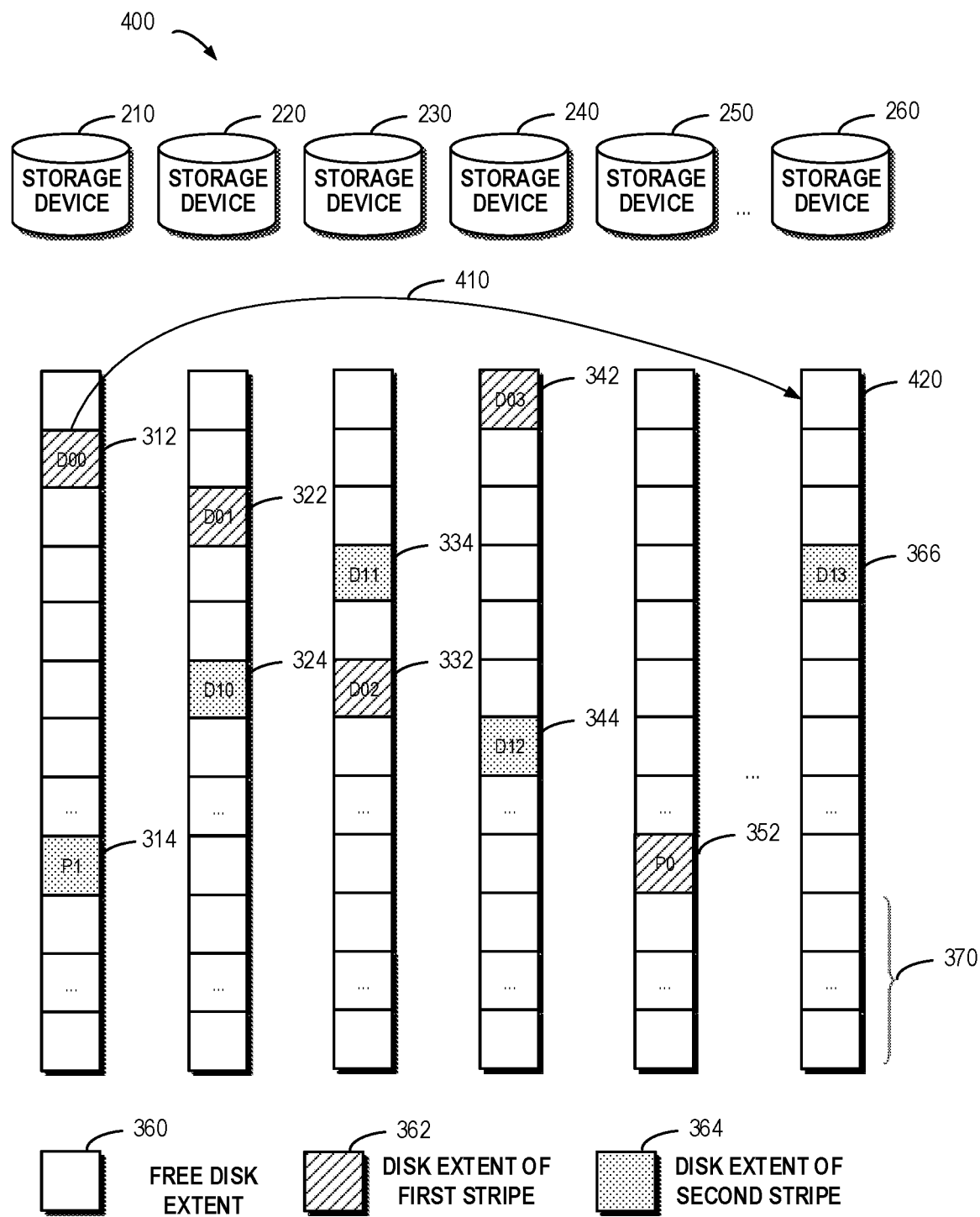
FIG. 4 schematically illustrates an architecture view for managing a storage system according to implementations of the present disclosure.

FIG. 4 schematically shows an architecture view 400 for managing a storage system according to implementations of the present disclosure. In the implementations, respective response times of storage devices 210 to 260 in the resource pool 270 may be monitored, and an extent with a heavier workload on a storage device with a longer response time (i.e. slower response speed) may be found. For example, suppose it is found that the storage device 210 has the slowest response speed, and an extent 312 on the storage device 210 has a heavier workload (e.g. the workload of the extent 312 may be determined from the number of requests waiting to access the extent 312). By moving the extent 312 to a free extent 420 on the storage device 260 with a faster response speed, the workload at the storage device 210 may be reduced, and further the overall response speed of the resource pool 270 may be increased.

With the above example implementation, a frequently accessed extent on a storage device with a slower response speed may be moved to a storage device with a faster response speed by taking into consideration response speed of various storage devices in the resource pool 270. Through the move, on the one hand, a workload at a storage device with a slower response speed may be reduced, and further the response speed of the slow storage device may be improved. On the other hand, a free storage device on a fast response device with a faster response speed may be put into full use. In this way, the overall response speed of various storage devices in the resource pool 270 may be increased.

Figure 5:
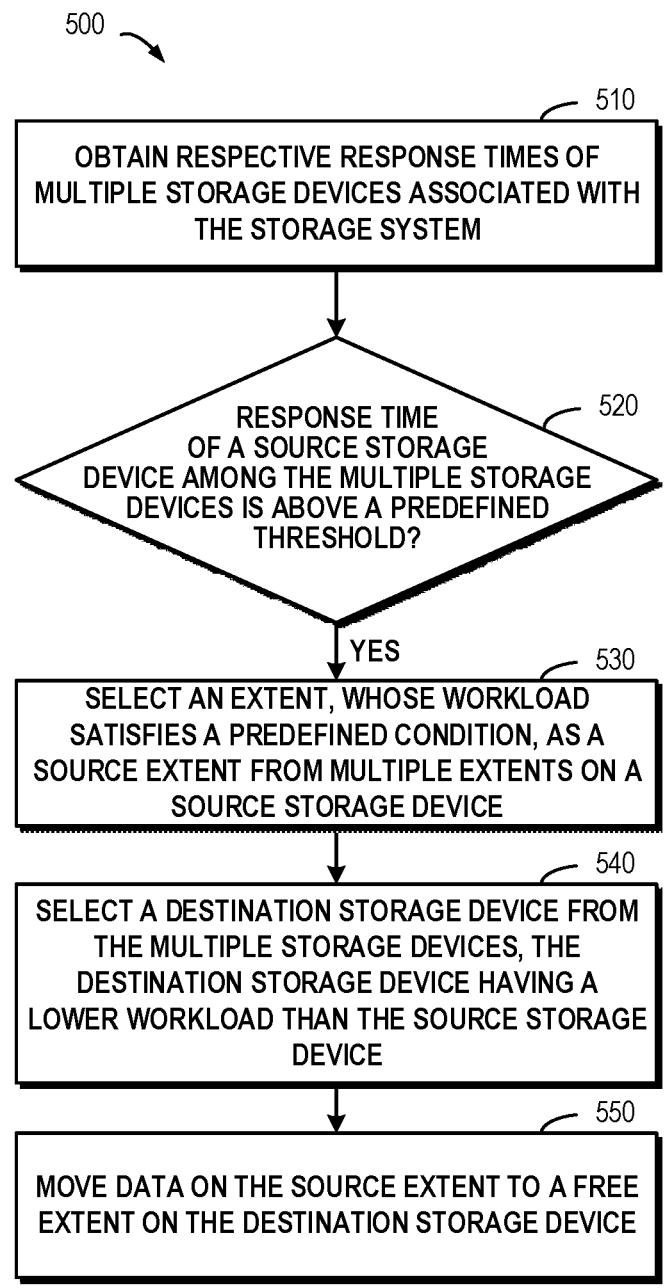
FIG. 5 schematically illustrates a flowchart of a method for managing a storage system according to implementations of the present disclosure.

With reference to FIG. 5, detailed description is presented below to more details on how to manage a storage system. FIG. 5 schematically shows a flowchart of a method 500 for managing a storage system according to implementations of the present disclosure. At block 510, respective response times of multiple storage devices in the storage resource pool 270 associated with the storage system are obtained. In this implementation, the above described disk I/O response time may be used as a response time of a storage device. For example, $T_{io}$ may be calculated on the basis of the number of I/Os processed at predefined time intervals (e.g. 10 seconds or other time duration).

At block 520, it is judged whether a response time of a source storage device among the multiple storage devices is above a predefined threshold. In this implementation, the predefined threshold may be set according to the storage system configuration or user demands. According to example implementations of the present disclosure, the predefined threshold may be set 15 seconds. Alternatively or in addition to, if the user sets a higher demand on the response speed of the storage system, then the predefined threshold may be set to a smaller value, e.g. 5 seconds or other value.

At block 520, if the judgment result is "yes," then the operation flow proceeds to block 530. At block 530, an extent whose workload satisfies a predefined condition is selected as a source extent from multiple extents on the source storage device. According to example implementations of the present disclosure, an extent with a higher workload or the highest workload may be selected as the source extent. In this implementation, the workload of each extent may be measured on the basis of the above described extent I/O load $L_{de}$. For example, the extent I/O load $L_{de}$ may be calculated on the basis of the number of requests for accessing each extent which are received in last 10 seconds. Suppose 150 requests for accessing a certain extent are received in last 10 seconds, then this extent's I/O load $L_{de}$ may be determined as $L_{de}=150/10=15$.

According to example implementations of the present disclosure, processing may be made to each extent on the source storage device so as to select the source extent. Specifically, for a given extent among multiple extents on the source storage device, the number of requests waiting to access the given extent may be determined. If the determined number is above the number of requests waiting to access a further extent among the multiple extents, then the given extent may be selected as the source extent. According to example implementations of the present disclosure, a comparison may be made between workloads of various extents on the source storage device, and an extent with the heaviest workload may be selected as the source extent. With the above example implementations, an extent with a heavier workload on the source storage device may be determined. The extent with the heaviest workload is used as the source extent, and the source extent is moved from the source storage device to other storage device with a lighter workload, so that the workload at the source storage device may be reduced greatly. Further, the response time of the source storage device may be reduced, and the response speed of the entire storage system may be improved.

At block 540, a destination storage device is selected from the multiple storage devices, here the destination storage device having a lower workload than the source storage device. It will be understood the workload of the storage device may be measured on the basis of various factors. For example, the workload may further be determined on the basis of the length of a waiting queue associated with the storage device. For another example, the workload may be determined on the basis of the disk response time $T_d$ of the storage device.

At block 550, data on the source extent are moved to a free extent on the destination storage device. This step may be executed on the basis of a conventional data move operation. After the move operation, a space where the source extent resides on the source storage space may be marked as a free space. At this point, by moving the source extent on the source storage device with slower response speed to a free extent on the destination storage device with faster response speed, the access request may be served by a storage device with faster response speed in the storage system as far as possible.

Figure 6:
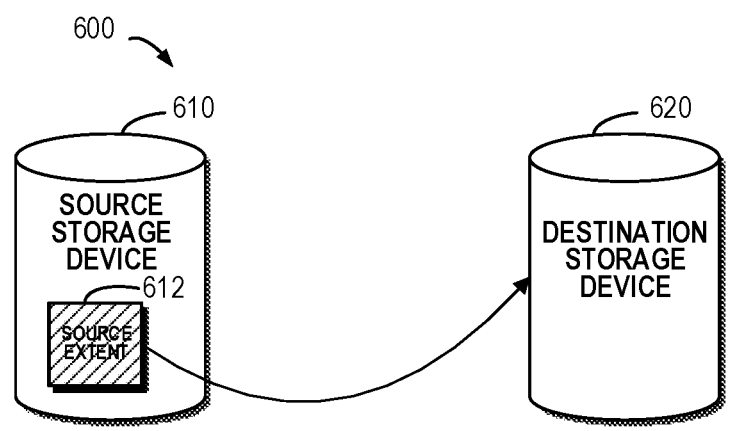
FIG. 6 schematically illustrates a block diagram for moving a source extent on a source storage device among multiple storage devices to a destination storage device according to implementations of the present disclosure.

FIG. 6 schematically shows a block diagram 600 for moving a source extent on a source storage device among multiple storage devices to a destination storage device according to implementations of the present disclosure. As depicted, a source storage device 610 with higher response time than a predefined threshold in the resource pool 270 may be determined by the above described method. Subsequently, a source extent 612 with the heaviest workload on the source storage device 610 may be determined by the above described method. At this point, data on the extent 612 may be copied to a free extent on a destination storage device 620.

It will be understood if the source storage device 610 is in a slow state for a long time, data thereon will be gradually moved to the faster storage device 620. At this point, since the amount of stored data reduces, the number of access requests received by the source storage device 610 will also reduce, and further concentrated access to the source storage device 610 might be relieved. Although an example that the source extent 612 is moved from the source storage device 610 to the destination storage device 620 is illustrated above, according to example implementations of the present disclosures, there may co-exist multiple source storage devices and multiple destination storage devices, and the move operations for multiple extents may be executed in parallel.

Figure 7:
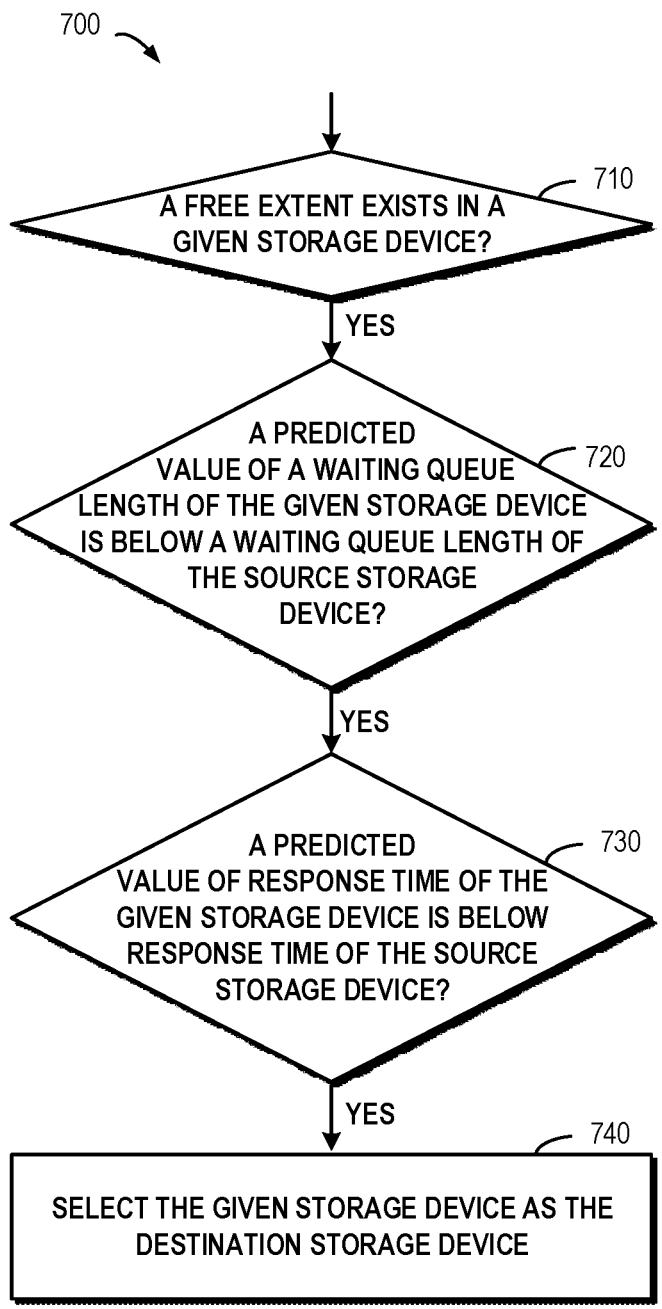
FIG. 7 schematically illustrates a flowchart of a method for selecting a destination storage device from multiple storage devices according to implementations of the present disclosure.

FIG. 7 schematically shows a flowchart of a method 700 for selecting a destination storage device from multiple storage devices according to implementations of the present disclosure. FIG. 7 shows operations for a given storage device in the resource pool 270, here which given storage device may be a storage device selected from all or part of storage devices in the resource pool 270. In other words, the method 700 may be executed for all or part of storage devices in the resource pool 270, so that an appropriate storage device may be selected from the resource pool 270 as a destination storage device.

At block 710, first it is determined whether the given storage device includes a free extent. If not, the flow may skip the given storage device and executes the method 700 for a next storage device in the resource pool 270. If the given storage device includes a free extent, then the operation flow proceeds to block 720. According to example implementations of the present disclosure, a storage device including a free extent is selected from the multiple storage devices as the destination storage device. Since the destination storage device is selected for the purpose of moving the source extent to the destination storage device, it should be first guaranteed the destination device includes a free extent.

At block 720, it is determined whether a predicted value of the length of a waiting queue of the given storage device is less than the length of a waiting queue of the source storage device. If the judgement result is "yes," then the operation flow proceeds to block 730. If the judgment result is "no," this means if the given storage device is selected as the destination storage device, then the workload of the destination storage device will be above that of the source storage device. Therefore, where the judgment result is "no," the flow may skip the given storage device and execute the method 700 for a next storage device in the resource pool 270.

At block 730, it is determined whether a predicted value of a waiting time of the given storage device is less than a waiting time of the source storage device. If the judgment result is "yes," then the operation flow proceeds to block 740. If the judgment result is "no," this means that if the given storage device is selected as the destination storage device, then the waiting time of the destination storage device will be greater than the waiting time of the source storage device. Therefore, where the judgment result is "no," the flow may skip the given storage device and execute the method 700 for a next storage device in the resource pool 270. At block 740, the given storage device may be selected as the destination storage device.

According to example implementations of the present disclosure, processing may be made to the multiple storage devices in the resource pool 270 so as to select the destination storage device. Specifically, for a given storage device among the multiple storage devices, the first number of requests waiting to access the source storage device may be determined, and the second number of requests waiting to access the given storage device may be determined. Subsequently, the given storage device may be selected as the destination storage device on the basis of the first number, the second number and the workload of the source extent.

In this implementation, the predicted value of the waiting queue length of the given storage device may be determined on the basis of the second number and the extent I/O load $L_{de}$ for the source extent. Specifically, the predicted value $Q'_{io}$ of the waiting queue length of the given storage device may be determined from Equation 2 below.

$$Q'_{io}=Q_{io}+L_{de} \qquad \text{Equation 2}$$

In Equation 2, $Q_{io}$ represents the waiting queue length of the given storage device, and $L_{de}$ represents the extent I/O load. With the above example implementations, the number of requests waiting to access the source storage device may be compared with the predicted value of the number of requests waiting to access each storage device in the resource pool 270, so that a storage device associated with less access requests may be selected from the resource pool 270 as the destination storage device.

According to example implementations of the present disclosure, the response time of the source storage device may be compared with the predicted value of the response time of each storage device in the resource pool 270, so that a storage device with a shorter response time may be selected from the resource pool 270 as the destination storage device. Specifically, for a given storage device among the multiple storage devices, the predicted value of the response time of the given storage device may be determined on the basis of the second number of requests waiting to access the given storage device, the number of requests waiting to access a given extent and the need time for processing one request by the given storage device. If the predicted value of the response time of the given storage device is not above the response time of the source storage device, then the given storage device is selected as the destination storage device. Specifically, the predicted value of the response time of the given storage device may be determined from Equation 3 below.

$$T'_d=(Q_{io}+L_{de}) \times T_{io} \qquad \text{Equation 3}$$

In Equation 3, $Q_{io}$ represents the waiting queue length of the given storage device, $L_{de}$ represents the extent I/O load, and $T_{io}$ represents the disk I/O response time of the given storage device. With the above example implementations, a storage device with a smaller predicted value of the response time may be selected from the resource pool 270 as the destination storage device. Further, various requests may be accessed with faster response speed.

According to example implementations of the present disclosure, a secure queue length may further be set for each storage device. Here, the secure queue length defines the maximum number of requests waiting to access the source storage device, which supports the normal operation of the storage device. In other words, where the length of the access queue waiting to access the given storage device is not above the secure queue length, the normal operation of the given storage device may be guaranteed without a sharp fall in response speed.

According to the storage system configuration and/or other user demands, a respective secure queue length may be set for each storage device in the resource pool 270. For example, if multiple storage devices in the resource pool 270 have completely same configuration, then the same secure queue length (e.g. 120 or other value) may be set for each storage device at a start stage of the storage system. With the running of the storage system, when the workload of a certain storage device is increased and the response speed slows down, the secure queue length of the storage device may be reduced appropriately. With the above example implementations, the corresponding secure queue length of each storage device may be used as an indicator for measuring the health condition of the storage device.

According to example implementations of the present disclosure, if data on the source extent are moved to a free extent on the destination storage device, then the secure queue length associated with the source storage device may be reduced. It will be understood at this point the source storage device is a storage device with slower response speed, so the secure queue length of the source storage device may be reduced so as to indicate the running state of the source storage device deteriorates. According to example implementations of the present disclosure, the secure queue length $Q_s$ associated with the source storage device may be updated on the basis of Equation 4 below.

$$Q_S = \frac{k \times \text{Threshold} \times Q_{io}}{T_d} \quad \text{Equation 4}$$

In Equation 4, k represents a predefined coefficient (e.g. may be set to 0.8), Threshold is a predefined threshold (e.g. the threshold may be set to 15 seconds or other value) for judging whether the response time of a storage device is too long, $T_d$ represents the disk response time $T_d$ of the source storage device, and $Q_{io}$ represents the disk I/O queue length of the source storage device.

According to example implementations of the present disclosure, if the response time of the source storage device is quite long and the method according to the present disclosure is triggered frequently, then the secure queue length of the source storage device will be reduced significantly. If it is found the secure queue length associated with the source storage device is not above a predefined length threshold, this means the state of the source storage device deteriorates (e.g. might approach end of life). At this point, the source storage device may be replaced with a backup storage device. Specifically, the secure queue length of each storage device in the resource pool 270 may be monitored during the running of the storage system. If it is found the secure queue length of a certain storage device reduces below the predefined threshold, it may be considered the storage device might fail. Further, the state of the storage device may be notified to an administrator of the storage system so that the administrator may perform processing accordingly. Alternatively or in addition to, a corresponding processing step may be performed automatically, so as to replace the failed storage device.

It will be understood the storage device's approach to end-of-life is only one of possible reasons behind the increase of response time. When the storage device faces concentrated access within a period of time, the response time might also be increased. It will be understood after the period of concentrated access, the volume of access to the storage device might be restored to a normal level. At this point, the response time of the storage device will tend to normal, so the secure queue length of the storage device may be increased so as to indicate the storage device is being recovered gradually.

Figure 8:
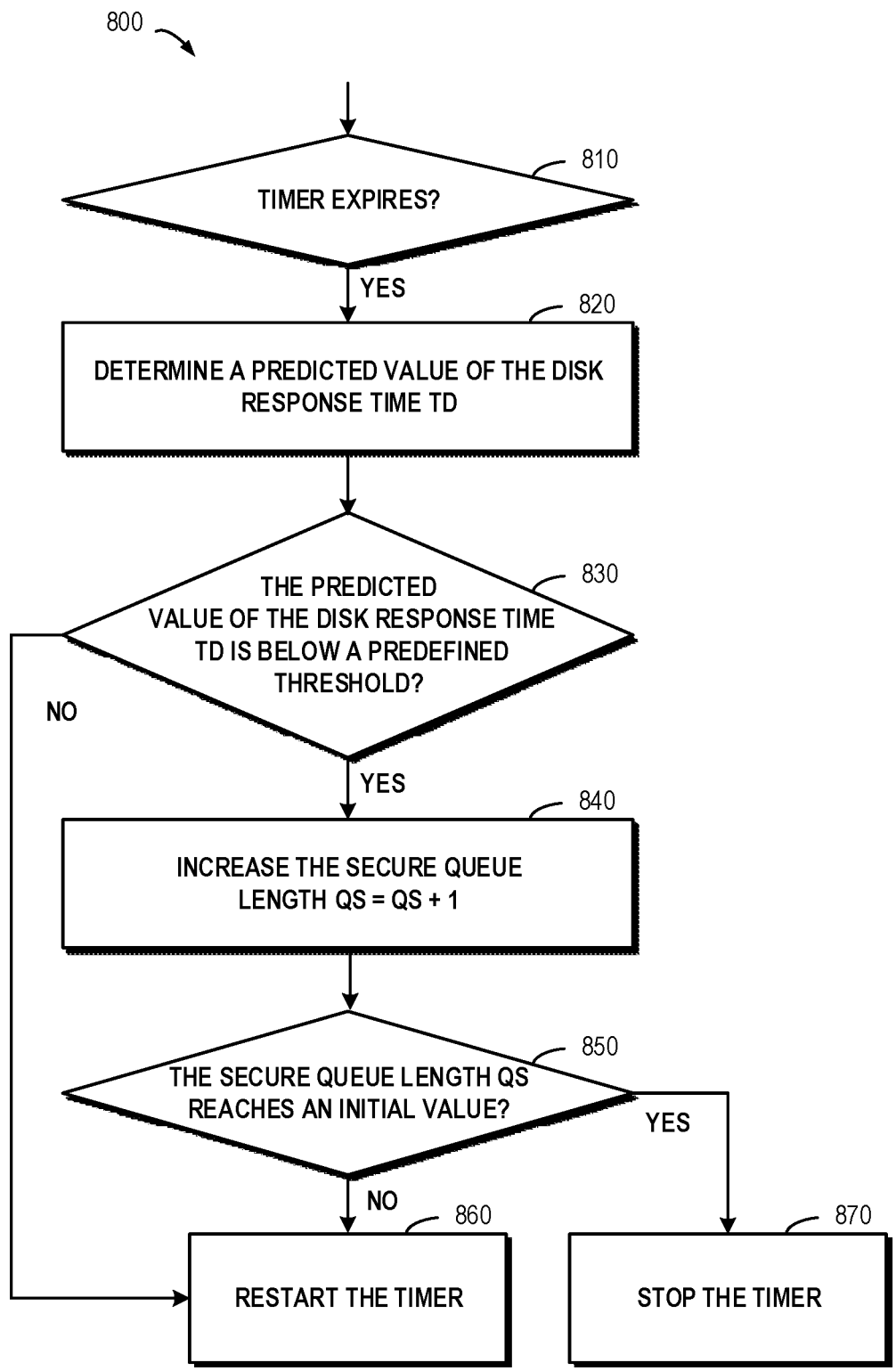
FIG. 8 schematically illustrates a flowchart of a method for updating a secure queue length of a source storage device according to implementations of the present disclosure.

According to example implementations of the present disclosure, in response to a predefined period of time elapsing, the secure queue length is increased till the increased secure queue length reaches an initial value of the secure queue length. With reference to FIG. 8, description is presented below to how to update the secure queue length of the source storage device. FIG. 8 schematically shows a flowchart of a method 800 for updating the secure queue length of the source storage device according to implementations of the present disclosure. In the implementations, a timer (e.g. a timer for several seconds may be set) may be set. At block 810, if the timer expires, then the operation flow proceeds to block 820. At block 820, a predicted value $T_d'$ of the disk response time $T_d$ of the storage device is determined. For example, the predicted value $T_d'$ of the disk response time $T_d$ may be determined from Equation 5 below.

$$T_d' = (Q_s + 1) \times T_{io} \quad \text{Equation 5}$$

In Equation 5, $Q_s$ represents the disk secure queue length of the source storage device, and $T_{io}$ represents the disk I/O response time of the source storage device. In the method as shown in FIG. 8, the secure queue length is increased by 1 (or other predefined value) at predefined time intervals (e.g. time intervals defined by the timer).

At block 830, it is judged whether the predicted value $T_d'$ of the disk response time is below a predefined threshold (the predefined threshold may be set on the basis of the storage system configuration and user demands). If the judgement result is "yes," then the operation flow proceeds to block 840, or else the operation flow proceeds to block 860 to restart the timer. At block 840, the maximum secure queue length associated with the source storage device may be increased by a predefined value (e.g. 1), and it is judged whether the updated maximum secure queue length reaches the initial value. If yes, then the operation flow proceeds to block 870 to stop the timer, or else the operation flow proceeds to block 860 to restart the timer.

According to example implementations of the present disclosure, when a workload decrease in the source storage device is detected, the secure queue length may be increased till the increased secure queue length reaches the initial value of the secure queue length.

According to example implementations of the present disclosure, the storage system is a Redundant Array of Independent Disks. At this point, first multiple extents included in a stripe associated with the source extent may be determined. Then, the destination storage device may be selected from the multiple storage devices other than corresponding storage devices where the multiple extents reside. It will be understood in the RAID-based storage system, it should be ensured various extents of one stripe reside on different storage devices. Therefore, it is ensured the selected destination storage device differs from storage devices where other extents of the stripe reside.

While examples of the method according to the present disclosure have been described in detail with reference to FIGS. 2 to 8, description is presented below to the implementation of a corresponding apparatus. According to example implementations of the present disclosure, provided is an apparatus for managing a storage system. The apparatus includes: an obtaining module configured to obtain respective response times of multiple storage devices associated with the storage system; a source extent selecting module configured to select an extent as a source extent, whose workload satisfies a predefined condition, from multiple extents on a source storage device in response to a response time of the source storage device among the multiple storage devices being above a predefined threshold; a destination storage device selecting module configured to select a destination storage device from the multiple storage devices, the destination storage device having a lower workload than the source storage device; and a moving module configured to move data on the source extent to a free extent on the destination storage device. The apparatus here may be configured to execute various steps of the above described method 500, which is not detailed.

Figure 9:
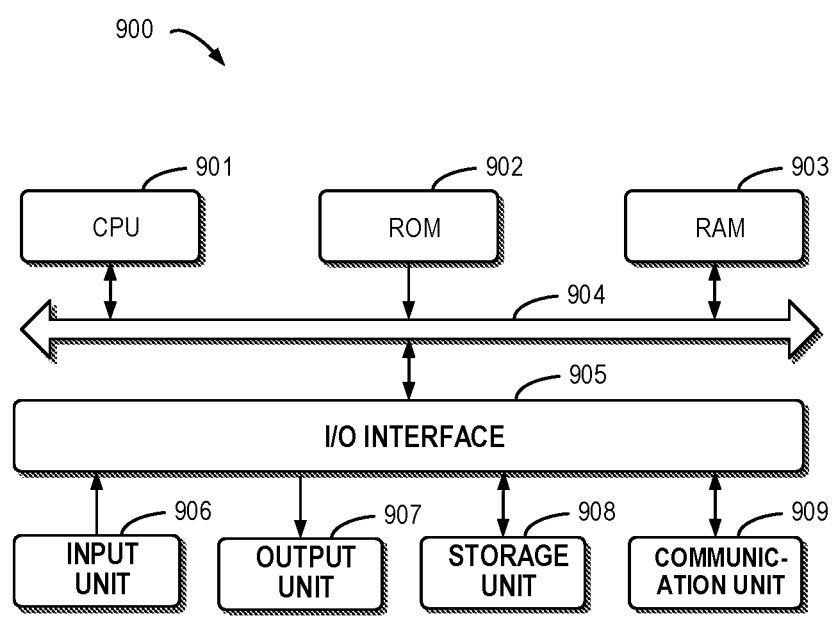
FIG. 9 schematically illustrates a block diagram of an apparatus for managing a storage system according to one example implementation of the present disclosure.

FIG. 9 schematically shows a block diagram of an apparatus 900 for managing a storage system according to example implementations of the present disclosure. As depicted, the apparatus 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the apparatus 900. CPU 901, ROM 902 and RAM 903 are connected to each other via a bus 904. The input/output (I/O) interface 905 is also connected to the bus 904.

A plurality of components in the apparatus 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the apparatus 900 to exchange information/data with other devices via the computer network, such as Internet, and/or various telecommunication networks.

The above described each process and treatment, such as the method 500, can also be executed by the processing unit 901. For example, in some implementations, the method 500 can be implemented as a computer software program tangibly included in the machine-readable medium, e.g., the storage unit 908. In some implementations, the computer program can be partially or fully loaded and/or mounted to the apparatus 900 via ROM 902 and/or the communication unit 909. When the computer program is loaded to the RAM 903 and executed by the CPU 901, one or more steps of the above described method 500 can be implemented. Alternatively, in other implementations, the CPU 901 also can be configured in other suitable manners to realize the above procedure/method.

According to one example implementation of the present disclosure, there is provided an apparatus for managing a storage system, the apparatus including: at least one processor; a volatile memory; and a memory coupled to the at least one processor, the memory having instructions stored thereon, the instructions, when executed by the at least one processor, causing the apparatus to perform acts. The acts include: obtaining respective response times of multiple storage devices associated with the storage system; selecting an extent, whose workload satisfies a predefined condition, as a source extent from multiple extents on a source storage device in response to a response time of the source storage device among the multiple storage devices being above a predefined threshold; selecting a destination storage device from the multiple storage devices, the destination storage device having a lower workload than the source storage device; and moving data on the source extent to a free extent on the destination storage device.

According to example implementations of the present disclosure, selecting the source extent includes: for a given extent among the multiple extents on the source storage device, determining the number of requests waiting to access the given extent, and selecting the source extent in response to the number being above the number of requests waiting to access a further extent among the multiple extents.

According to example implementations of the present disclosure, selecting the destination storage device from the multiple storage devices includes: for a given storage device among the multiple storage devices, determining the first number of requests waiting to access the source storage device, and determining the second number of requests waiting to access the given storage device; and selecting the given storage device as the destination storage device on the basis of the first number, the second number and an extent workload of the source extent.

According to example implementations of the present disclosure, selecting the destination storage device from the multiple storage devices includes: for a given storage device among the multiple storage devices, determining a predicted value of a response time of the given storage device on the basis of the second number of requests waiting to access the given storage device, the number of requests waiting to access a given extent as well as needed time for processing one request by the given storage device; and selecting the given storage device as the destination storage device in response to the predicted value not being above a response time of the source storage device.

According to example implementations of the present disclosure, selecting the destination storage device from the multiple storage devices includes: selecting the destination storage device from storage devices, which include a free extent, among the multiple storage devices.

According to example implementations of the present disclosure, the acts further include: reducing a secure queue length associated with the source storage device in response to data on the source extent being moved to a free extent on the destination storage device, the secure queue length defining the maximum number of requests waiting to access the source storage device, which supports normal operation of the source storage device.

According to example implementations of the present disclosure, the acts further include: replacing the source storage device with a backup storage device in response to the secure queue length associated with the source storage device not being above a predefined length threshold.

According to example implementations of the present disclosure, the acts further include: increasing the secure queue length till the increased secure queue length reaches an initial value of the secure queue length, in response to a predefined period of time elapsing.

According to example implementations of the present disclosure, the acts further include: increasing the secure queue length till the increased secure queue length reaches an initial value of the secure queue length, in response to a workload of the source storage device decreasing.

According to example implementations of the present disclosure, the storage system is a Redundant Array of Independent Disks, and selecting a destination storage device from the multiple storage devices includes: determining multiple extents included in a stripe associated with the source extent; and selecting the destination storage device from the multiple storage devices other than corresponding storage devices where the multiple extents reside.

According to example implementations of the present disclosure, there is provided a computer program product. The computer program product is tangibly stored on a computer readable medium and includes machine executable instructions which, when executed, cause a machine to implement the method according to the present disclosure.

According to one example implementation of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcode, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing a storage system, the method comprising:
   obtaining respective response times of multiple storage devices associated with the storage system;

selecting an extent, whose workload satisfies a predefined condition, as a source extent from multiple extents on a source storage device in response to a response time of the source storage device among the multiple storage devices being above a predefined threshold;

selecting a destination storage device from the multiple storage devices, the destination storage device having a lower workload than the source storage device; and moving data on the source extent to a free extent on the destination storage device;

wherein selecting the destination storage device from the multiple storage devices comprises: for a given storage device among the multiple storage devices, determining a first number of requests waiting to access the source storage device, and determining a second number of requests waiting to access the given storage device, and selecting the given storage device as the destination storage device on the basis of the first number, the second number and an extent workload of the source extent.

2. The method of claim 1, wherein selecting the extent as the source extent comprises: for a given extent among the multiple extents on the source storage device, determining a number of requests waiting to access the given extent, and selecting the given extent as the source extent in response to the number being above a number of requests waiting to access another extent among the multiple extents.

3. The method of claim 1, wherein selecting the destination storage device from the multiple storage devices comprises:

prior to determining the second number of requests waiting to access the given storage device, determining whether the given storage device includes any free extents.

4. The method of claim 1, further comprising:

reducing a secure queue length associated with the source storage device in response to the data on the source extent being moved to the free extent on the destination storage device, the secure queue length defining a maximum number of requests waiting to access the source storage device, which supports normal operation of the source storage device.

5. The method of claim 4, further comprising:

replacing the source storage device with a backup storage device in response to the secure queue length associated with the source storage device not being above a predefined length threshold.

6. The method of claim 5, further comprising:

increasing the secure queue length till the increased secure queue length reaches an initial value of the secure queue length, in response to a predefined period of time elapsing.

7. The method of claim 5, further comprising:

increasing the secure queue length till the increased secure queue length reaches an initial value of the secure queue length, in response to a workload of the source storage device decreasing.

8. The method of claim 1, wherein the storage system is a Redundant Array of Independent Disks, and selecting the destination storage device from the multiple storage devices further comprises:

determining multiple extents comprised in a stripe that is associated with the source extent; and selecting the given storage device from the multiple storage devices other than corresponding storage devices where the multiple extents reside.

9. A method for managing a storage system, the method comprising:

obtaining respective response times of multiple storage devices associated with the storage system;

selecting an extent, whose workload satisfies a predefined condition, as a source extent from multiple extents on a source storage device in response to a response time of the source storage device among the multiple storage devices being above a predefined threshold;

selecting a destination storage device from the multiple storage devices, the destination storage device having a lower workload than the source storage device;

and moving data on the source extent to a free extent on the destination storage device;

wherein selecting the destination storage device from the multiple storage devices comprises:

for a given storage device among the multiple storage devices, determining a predicted value of a response time of the given storage device on the basis of a second number of requests waiting to access the given storage device, a number of requests waiting to access a given extent as well as needed time for processing one request by the given storage device;

and selecting the given storage device as the destination storage device in response to the predicted value not being above response time of the source storage device.

10. An apparatus for managing a storage system, comprising:

at least one processor;

a volatile memory; and a memory coupled to the at least one processor and having instructions stored thereon, the instructions, when executed by the at least one processor, causing the apparatus to perform acts comprising:

obtaining respective response times of multiple storage devices associated with the storage system, selecting an extent, whose workload satisfies a predefined condition, as a source extent from multiple extents on a source storage device in response to a response time of the source storage device among the multiple storage devices being above a predefined threshold, selecting a destination storage device from the multiple storage devices, the destination storage device having a lower workload than the source storage device, and moving data on the source extent to a free extent on the destination storage device;

wherein selecting the destination storage device from the multiple storage devices comprises: for a given storage device among the multiple storage devices, determining a first number of requests waiting to access the source storage device, and determining a second number of requests waiting to access the given storage device, and selecting the given storage device as the destination storage device on the basis of the first number, the second number and an extent workload of the source extent.

11. The apparatus of claim 10, wherein selecting the extent as the source extent comprises: for a given extent among the multiple extents on the source storage device, determining a number of requests waiting to access the given extent, and selecting the given extent as the source extent in response to the number being above a number of requests waiting to access another extent among the multiple extents.

12. The apparatus of claim 10, wherein selecting the destination storage device from the multiple storage devices comprises:

prior to determining the second number of requests waiting to access the given storage device, determining whether the given storage device includes any free extents.

13. The apparatus of claim 11, the acts further comprising:

reducing a secure queue length associated with the source storage device in response to the data on the source extent being moved to the free extent on the destination storage device, the secure queue length defining a maximum number of requests waiting to access the source storage device, which supports normal operation of the source storage device.

14. The apparatus of claim 13, the acts further comprising:

replacing the source storage device with a backup storage device in response to the secure queue length associated with the source storage device not being above a predefined length threshold.

15. The apparatus of claim 14, the acts further comprising:

increasing the secure queue length till the increased secure queue length reaches an initial value of the secure queue length, in response to a predefined period of time elapsing.

16. The apparatus of claim 14, the acts further comprising:

increasing the secure queue length till the increased secure queue length reaches an initial value of the secure queue length, in response to a workload of the source storage device decreasing.

17. The apparatus of claim 10, wherein the storage system is a Redundant Array of Independent Disks, and selecting a destination storage device from the multiple storage devices further comprises:

determining multiple extents comprised in a stripe that is associated with the source extent; and selecting the given storage device from the multiple storage devices other than corresponding storage devices where the multiple extents reside.

18. An apparatus for managing a storage system, comprising:

at least one processor;

a volatile memory;

and a memory coupled to the at least one processor and having instructions stored thereon, the instructions, when executed by the at least one processor, causing the apparatus to perform acts comprising:

obtaining respective response times of multiple storage devices associated with the storage system, selecting an extent, whose workload satisfies a predefined condition, as a source extent from multiple extents on a source storage device in response to a response time of the source storage device among the multiple storage devices being above a predefined threshold, selecting a destination storage device from the multiple storage devices, the destination storage device having a lower workload than the source storage device, and moving data on the source extent to a free extent on the destination storage device;

wherein selecting the destination storage device from the multiple storage devices comprises:

for a given storage device among the multiple storage devices, determining a predicted value of a response time of the given storage device on the basis of a second number of requests waiting to access the given storage device, a number of requests waiting to access a given extent as well as needed time for processing one request by the given storage device;

and selecting the given storage device as the destination storage device in response to the predicted value not being above response time of the source storage device.

19. A computer program product having a non-transitory computer readable medium which stores a set of instructions to manage a storage system; the set of instructions, when carried out by computerized circuitry, causing the computerized circuitry to perform a method of:

obtaining respective response times of multiple storage devices associated with the storage system;

selecting an extent, whose workload satisfies a predefined condition, as a source extent from multiple extents on a source storage device in response to a response time of the source storage device among the multiple storage devices being above a predefined threshold;

selecting a destination storage device from the multiple storage devices, the destination storage device having a lower workload than the source storage device; and moving data on the source extent to a free extent on the destination storage device;

wherein selecting the destination storage device from the multiple storage devices comprises: for a given storage device among the multiple storage devices, determining a first number of requests waiting to access the source storage device, and determining a second number of requests waiting to access the given storage device, and selecting the given storage device as the destination storage device on the basis of the first number, the second number and an extent workload of the source extent.

20. The computer program product of claim 19, wherein selecting the extent as the source extent comprises: for a given extent among the multiple extents on the source storage device, determining a number of requests waiting to access the given extent, and selecting the given extent as the source extent in response to the number being above a number of requests waiting to access another extent among the multiple extents.

21. The computer program product of claim 19, wherein selecting the destination storage device from the multiple storage devices comprises:

prior to determining the second number of requests waiting to access the given storage device, determining whether the given storage device includes any free extents.

* * * * *

UNITED STATES PATENT AND TRADEMARK OFFICE
CERTIFICATE OF CORRECTION

PATENT NO. : 10,976,967 B2  
APPLICATION NO. : 16/356281  
DATED : April 13, 2021  
INVENTOR(S) : Jianbin Kang et al.

Page 1 of 1

It is certified that error appears in the above-identified patent and that said Letters Patent is hereby corrected as shown below:

In the Claims

Claim 13, Column 19, Line 14, reads "13. The apparatus of claim 11, the acts further comprising:" should read --13. The apparatus of claim 10, the acts further comprising:--

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*